United States Patent

Dolson

[11] Patent Number: 5,335,925
[45] Date of Patent: Aug. 9, 1994

[54] SNOW SLED

[76] Inventor: Murray Dolson, R.R. #3, Prescott, Ontario, Canada, K0E 1T0

[21] Appl. No.: 993,614

[22] Filed: Dec. 21, 1992

[30] Foreign Application Priority Data

Jan. 23, 1992 [CA] Canada ............................ 2059886

[51] Int. Cl.$^5$ ............................................ B62B 13/08
[52] U.S. Cl. .................................... 280/16; 280/211; 280/22.1
[58] Field of Search ................ 280/16, 17, 26, 28.14, 280/28.15, 21.1, 22, 22.1

[56] References Cited

U.S. PATENT DOCUMENTS

| 3,140,099 | 7/1964 | Feu | 280/16 |
| 3,173,703 | 3/1965 | Isenberger | 280/21.1 |
| 3,326,569 | 6/1967 | Leeming | 280/16 |
| 3,398,970 | 8/1968 | Horiuchi | 280/16 |
| 4,775,161 | 10/1988 | Bridges | 280/16 |

FOREIGN PATENT DOCUMENTS

| 1037529 | 8/1978 | Canada . | |
| 1130843 | 8/1982 | Canada . | |
| 1923926 | 6/1978 | Fed. Rep. of Germany | 280/16 |

Primary Examiner—Richard M. Camby
Attorney, Agent, or Firm—Dressler, Goldsmith, Shore & Milnamow, Ltd.

[57] ABSTRACT

In a ride-on snow sled of the steerable type, a pair of support side runners are fixedly attached to fore and aft vertically oriented legs. The legs are adapted to slide up and down within hollow tubular frame members. The upper ends of the front legs of each runner are attached to one another by a non-compressible and non-extendible cable member. Similarly, the rear pair of legs are connected through a rear tubular frame. Thus, a shift of weight causing the right ski to extend downwardly from the frame causes a proportional lift or rise in the left ski such that the legs on the left ski retract into the frame. With the skis at different heights proportionate to the slope of the hill, an edging effect is created, permitting the operator to traverse the hill without sliding in much the same manner as a skier traverses a hill.

5 Claims, 3 Drawing Sheets

SNOW SLED

FIELD OF INVENTION

This invention relates to snow sleds, and more particularly, steerable snow sleds of the ride-on variety.

BACKGROUND

In recent years, ride-on steerable snow sleds employing generally three runners, two for support and one for steering, have become popular. These permit the operator to steer around other sledders or obstacles on a hill. The sleds are particularly popular with people who are unable to master the art of snow skiing.

A typical three-runnered steerable ride-on snow sled is disclosed and claimed in Canadian Patent 1,037,529 to Odd. These known snow sleds, however, suffer one major difficulty, in that the side or support runners are fixedly attached to the frame and thus, lack the edging effect present in conventional skiing. Therefore, traversing a hill, particularly in icy conditions is very difficult, if not impossible. Furthermore, because the edging effect is not present, the sled can easily overturn. In fact, in icy conditions, even when the sled is directed in a downhill direction, the steerable front runner is not sufficient to produce the desired turn.

This problem of lack of edging or weighting of one ski over the other in ski sleds is known. The problem has attempted to be overcome by fairly complex pivotal support skis which function by means of parallelogram or other type linkages, which are manipulated by the operator. One such device is disclosed in U.S. Pat. No. 3,398,970—Kotaro Horiuchi. Similarly, in Canadian Patent 1,130,843, a sled having tiltable runners and runners which are adapted to move one ahead of the other, is disclosed and claimed.

These sleds, however, are complicated, cumbersome, expensive to manufacture, and difficult to manipulate by the novice.

Therefore, it is an object of the present invention to provide an inexpensive simple functioning steerable ride-on snow sled which is adapted to edge into a hill and traverse without sliding by the operator varying his weight on the support skis.

It is a further object of the invention to produce a durable inexpensive steerable snow sled that can be quickly and easily manipulated by the novice operator.

SUMMARY OF THE INVENTION

Therefore this invention seeks to provide a snow sled comprising a frame and at least three runners; one of said runners being rotatably mounted and adapted to function as a steering means; two of said runners adapted to function as support and edging means; said two runners being functionally connected to one another, such that in operation, a downward movement of one runner produces a proportional upward movement of said other runner.

In a preferred embodiment, the snow sled has a lead central steerable runner and two rear side support runners. The frame includes a pair of inverted U-shaped hollow tubular members attached to one another by horizontally disposed struts or cross-braces. On each of the rear side support skis are fixedly attached a vertically oriented front leg and a vertically oriented rear leg. These legs are adapted to slide up and down in the open ends of the fore and aft U-shaped hollow tubular members. Located within each of these members is a flexible non-extendible and non-compressible connection cable. The upper ends of both the front legs and the rear legs are fixedly attached to an end of the connection cable. Thus, the right and left rear support skis are capable of moving upwardly or downwardly by means of the slidable legs within the frame. Assuming the operator's weight is evenly distributed, the rear and front portions of the ski move equally up and down. Because of the non-compressible, non-extendible connection cable, a corresponding extension downwardly of one support ski produces a corresponding retraction upwardly of the other support ski.

The upward or downward movement of the right or left support runner is limited by permanently affixed horizontally disposed pins through the lower ends of the tubular frames which are adapted to engage vertically oriented slots or apertures formed within each of the legs.

In operation, the operator leans on the right ski, pressing it downwardly, which produces a corresponding lift or rise of the left ski, such that the right ski will function as the downhill ski edging into the hill while traversing.

A weight shift to the left reverses the downhill ski. In order to turn right and traverse the hill in the opposite direction, the front ski is turned and the rider gradually equalizes his weight such that both skis are level, then as the turn is completed the rider shifts his weight onto the left ski, thereby extending the left ski downwardly and raising the right ski upwardly in order to have the left ski as the downhill ski while traversing the hill in the opposite direction.

BRIEF DESCRIPTION OF THE DRAWINGS

A preferred embodiment of the invention is shown in greater detail in conjunction with the following drawings wherein.

DETAILED DESCRIPTION OF THE INVENTION

Figure 1:
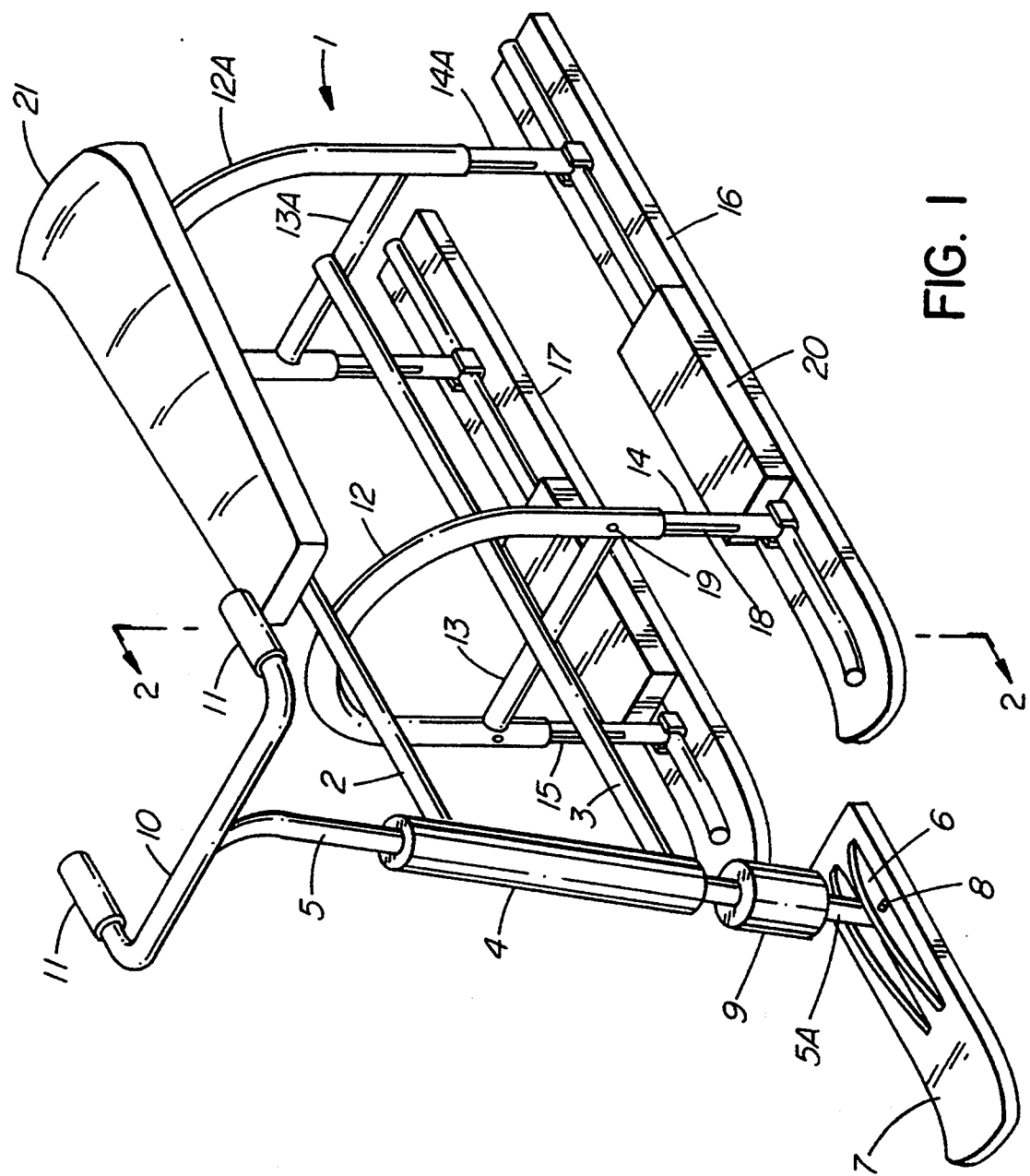
FIG. 1 is a perspective view of the snow sled.

In FIG. 1, the snow sled is shown generally as (1). The frame is comprised of two horizontally disposed longitudinal struts (2) and (3) which are fixedly attached at their fore ends, in parallel spaced-apart relationship, to a steering collar (4). The lower strut (3) is longer than the upper strut (2) such that a steering column (5), which fits within collar (4) for rotation therein, is at an angle which extends obliquely forwardly and downwardly. The steering column (5) is connected through a cover collar (9) to a lower steering column (5a). In an alternative embodiment, a spring loaded shock absorber connection means of a known type is located within collar (9) and connects upper column (5) to lower column (5a). Lower steering column (5a) is pivotally connected by pin (8) to brackets (6) which are fixedly attached to steering runner (7).

Fixedly mounted to the top of steering column (5) is a pair of handle bars (10) having optional handgrips (11). Hollow tubular inverted U-shaped frame members (12) and (12a) are welded to and extend downwardly in a vertical manner from strut (2). Horizontally disposed cross-braces (13) and (13a) extend from side to side of each U-shaped member and are centrally welded to the lower horizontally disposed strut (3).

The sled is equipped with two support runners or skis (16) and (17), which are fixedly attached to upright vertically oriented legs (14) and (14a), and (15) and (15a). Leg members (14) and (15) are adapted to slide within the ends of U-shaped hollow tubular frame member (12). Similarly, rear legs (14a) and (15a) are adapted to slide within the ends of rear U-shaped hollow tubular frame member (12a). Each of the legs (14), (14a), (15), and (15a), is equipped with a vertically oriented slot or aperture (18). In a preferred embodiment the aperture can be anywhere between 5 to 10 inches in length, depending upon the size of the sled.

Figure 2:
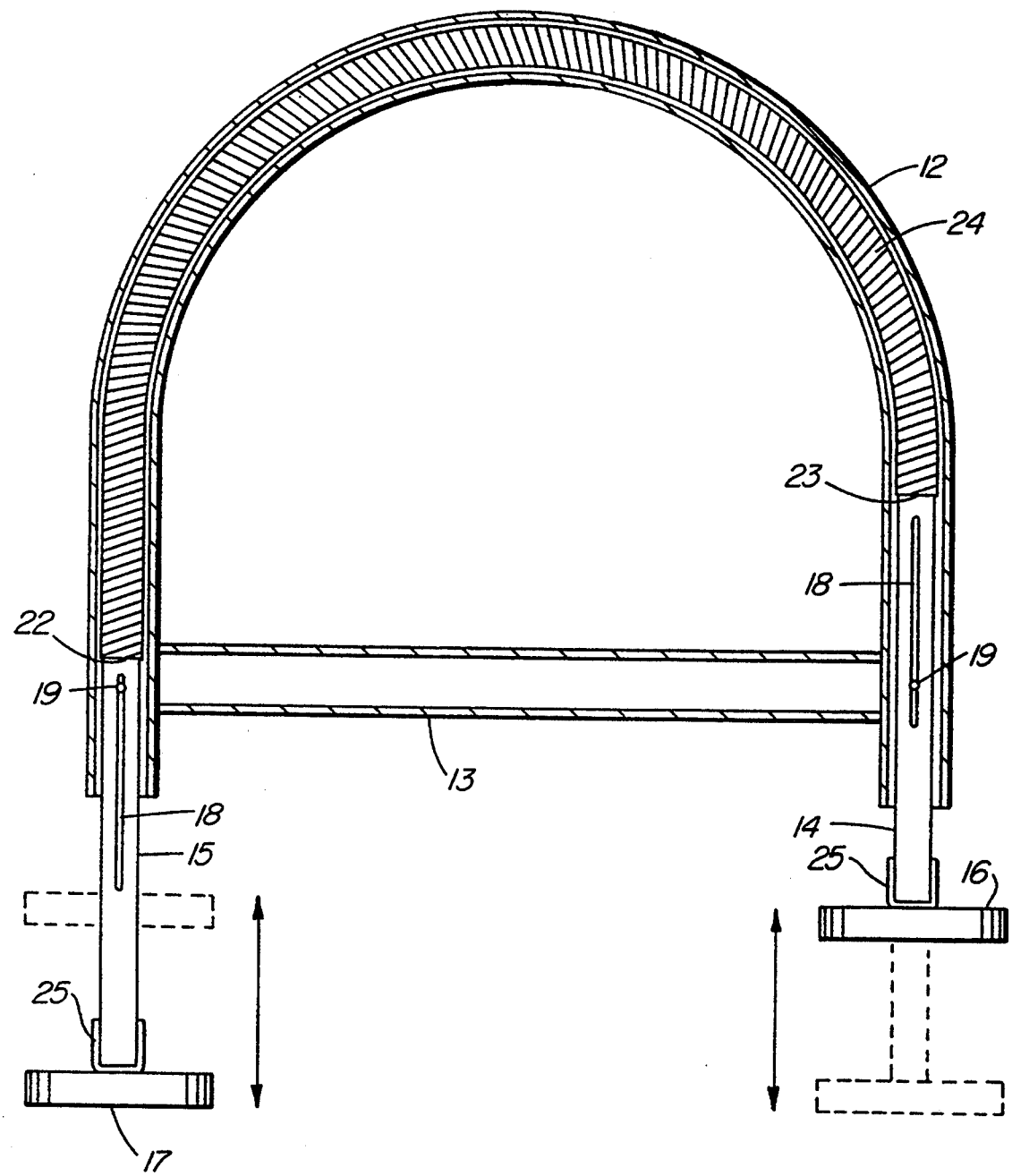
FIG. 2 is a cross-section 2—2.

In each of the lower portions of the hollow inverted U-shaped tubular frame members (12) and (12a) is a permanently affixed horizontal pin (19) which is adapted to fit through respective apertures (18), thus limiting the up and down movement of skis (16) and (17). The sled is also equipped with a seat (21) and optional footrests (20), mounted upon support skis (16) and (17). As shown in FIG. 2, the legs (14), (15), (14a), and (15a) are fixedly and non-pivotally attached to skis (16) and (17) by means of brackets (25) or other suitable means.

As shown in cross-section of the tubular frame member (12) in FIG. 2, legs (14) and (15) are connected to one another by means of a flexible cable (24) which is attached to the respective top portions (22) and (23) by any conventional fastening means. The connecting member (24) can be made out of any suitable material as long as it is non-extendible and non-compressible, and maintains suitable flexibility to move freely within inverted U-shaped tubular hollow member (12). Possible alternative embodiments could be the use of permanently sealed hydraulic fluid. Any suitable material is contemplated by the invention as long as an upward retraction of one ski (16) produces a proportional extension away of the frame of the opposite support ski (17) or vice versa. Thus, in FIG. 2, the right support ski (17) is extended in solid lines and the left support ski (16) is retracted upwardly, in solid lines. The reverse is true in dotted lines.

Figure 3A:
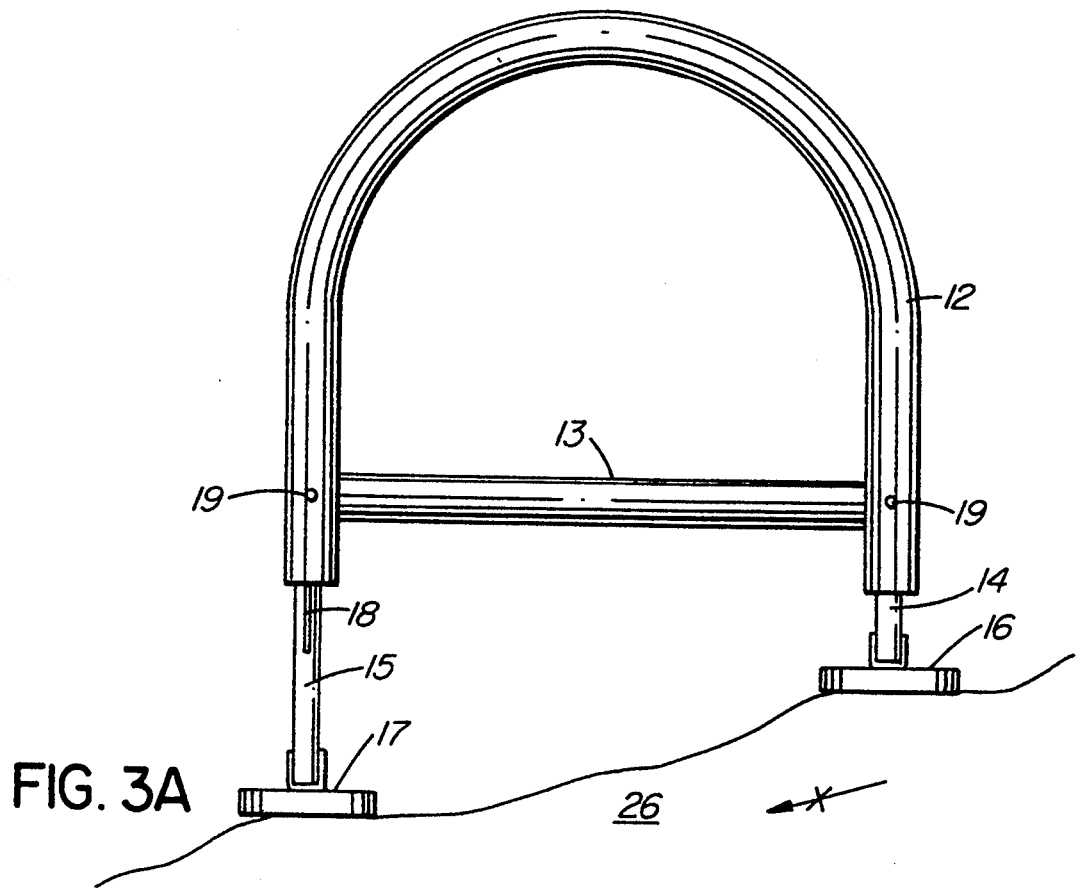
FIG. 3a is a front view of the tubular frame and support runners wherein the right support ski is the downhill ski.
Figure 3B:
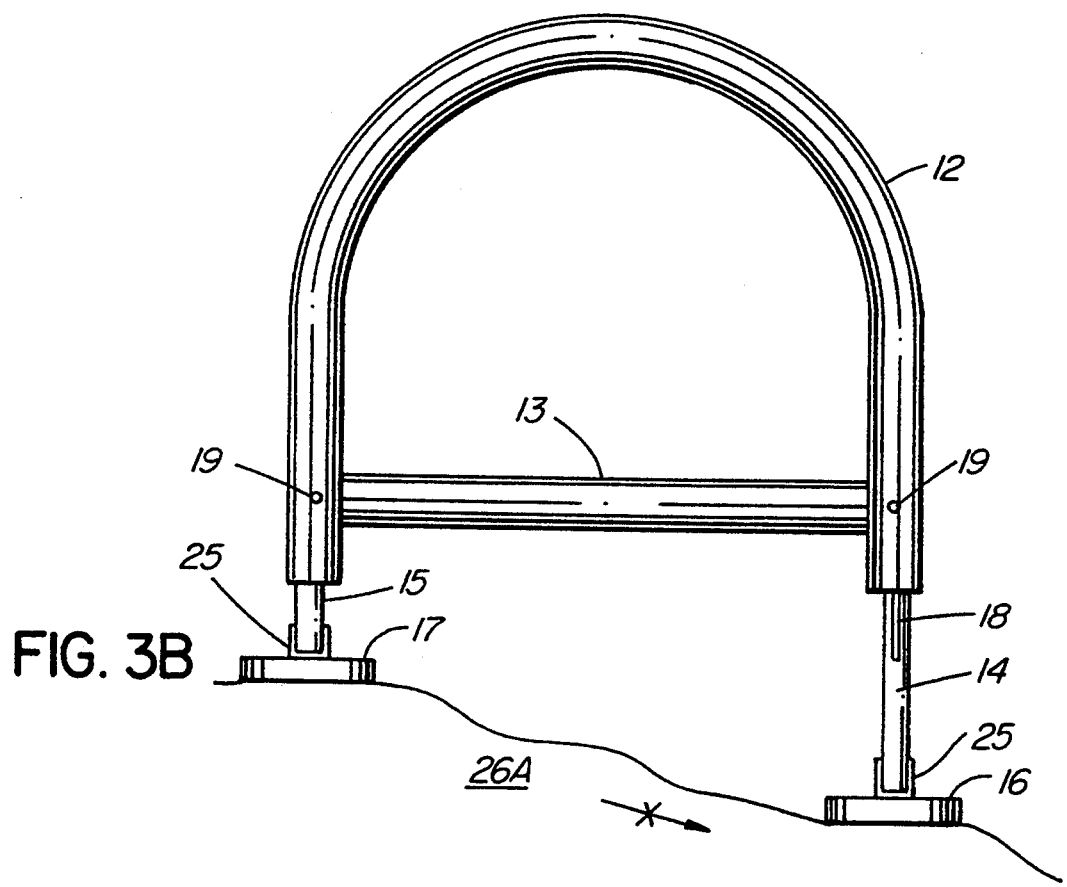
FIG. 3b is a similar view wherein the left support ski is the downhill ski.

FIGS. 3a and 3b illustrate the right and left skis, (17) and (16), in opposite positions while traversing a hill in opposite directions. The slope of the hill is shown generally in FIG. 3a as (26), and at FIG. 3b as (26a). In FIG. 3a the right support ski (17) is the downhill ski, and in FIG. 3b, the left support ski (16) is the downhill ski.

In operation, as shown in FIG. 3a, the operator simply places greater weight on the right support ski (17) to traverse a hill of a slope shown as (26), and similarly in FIG. 3b, places greater weight on the left support ski (16) to traverse a slope shown as (26a). Thus, both skis produce an edging effect into the slope and prevent downward slippage in the direction in FIG. 3a and 3b shown generally with an arrow with an X therein.

Although a preferred embodiment of the invention has been described, it is understood that any type of ride-on apparatus wherein a corresponding lowering of one side produces a corresponding rise in the opposite side, is contemplated by this invention.

For example, the rear frame of a wheelchair is constructed to include an inverted U-shaped hollow tubular member. Upstanding legs are attached to a tubular sleeve about the rear axle of the wheelchair on either side of said sleeve. The two legs are adapted to fit within the two open ends of the frame and be connected to one another by a non-extendible, non-compressible connecting means. Thus, a weight shift will create an extension of one leg, moving the adjacent wheel downwardly from the frame; and causing a corresponding retraction of the other leg (with corresponding rise of the other wheel) such that the rider remains vertically upright when traversing a slope.

What I claim as my invention is:

1. A snow sled comprising a frame and at least three runners;
    said frame including a pair of inverted U-shaped, hollow tubular members fixedly attached to one another by means of horizontally disposed struts or cross-braces;
    one of said runners being rotatably mounted and adapted to function as a steering means;
    two of said runners adapted to function as support and edging means;
    each of said two runners being fixedly attached to two or more vertically oriented legs;
    said legs being adapted to slidably fit within said frame;
    said two runners being functionally connected to one another such that, in operation, a downward movement of one runner produces a proportional upward movement of said other runner.

2. A snow sled as claimed in claim 1, wherein each of said vertically oriented legs slidably fits within an open end of said inverted U-shaped, hollow tubular frame members.

3. A snow sled as claimed in claim 2, wherein a front leg on one of said runners, adapted to function as support and edging means, is connected at its upper end to an upper end of a front leg on the other of said runners by a flexible, non-compressible and non-extendible connection means, located within the one of said U-shaped, hollow tubular frame members; and
    a rear leg, on one of said runners, is similarly connected to a rear leg on the other of said runners by a second of said connection means in a second of said U-shaped, hollow tubular frame members.

4. A snow sled as claimed in claim 3, wherein each of said legs includes an elongate, vertically oriented aperture, adapted to engage a horizontally disposed pin, one of which is fixedly secured through each of the lower portions of said inverted U-shaped, tubular members, such that in operation, upward or downward sliding movement of said legs within said frame is limited.

5. A snow sled as claimed in claim 3, wherein said connection means comprises any suitable material including cables and the like;
    said material being non-extendible and non-compressible, such that when in operation, a corresponding movement upwardly or downwardly of one ski produces a directly inversely proportional movement of said other ski.

* * * * *